(12) United States Patent
De Mare et al.

(10) Patent No.: US 11,644,099 B2
(45) Date of Patent: May 9, 2023

(54) METHOD OF SHIFTING A VEHICLE TRANSMISSION

(71) Applicant: DANA BELGIUM N.V., Bruges (BE)

(72) Inventors: Arnout R. L. De Mare, Roosbeek (BE); Jerome Janssens, Braine-le-Chateau (BE); Mark M. A. Maessen, Roermond (NL); Keivan Shariatmadar, Eeklo (BE); Mark R. J. Versteyhe, Oostkamp (BE); Thomas J. Vyncke, Deinze (BE)

(73) Assignee: DANA BELGIUM N.V., Bruges (BE)

( * ) Notice: Subject to any disclaimer, the term of this patent is extended or adjusted under 35 U.S.C. 154(b) by 1197 days.

(21) Appl. No.: 16/305,542

(22) PCT Filed: May 30, 2017

(86) PCT No.: PCT/EP2017/063010
§ 371 (c)(1),
(2) Date: Nov. 29, 2018

(87) PCT Pub. No.: WO2017/207553
PCT Pub. Date: Dec. 7, 2017

(65) Prior Publication Data
US 2021/0239207 A1    Aug. 5, 2021

(30) Foreign Application Priority Data
May 30, 2016    (EP) .................................. EP16172049

(51) Int. Cl.
*F16H 61/684*    (2006.01)
*F16H 61/00*    (2006.01)
*F16H 61/04*    (2006.01)

(52) U.S. Cl.
CPC ....... *F16H 61/684* (2013.01); *F16H 61/0021* (2013.01); *F16H 61/0403* (2013.01); *F16H 2061/0407* (2013.01)

(58) Field of Classification Search
CPC ............. F16H 61/0021; F16H 61/0403; F16H 61/684; F16H 2061/0407; F16D 48/062
See application file for complete search history.

(56) References Cited

U.S. PATENT DOCUMENTS

| 3,799,308 A | 3/1974 | Erisman |
| 4,527,678 A | 7/1985 | Pierce |

(Continued)

FOREIGN PATENT DOCUMENTS

| EP | 0632217 | 1/1995 |
| EP | 1450074 | 8/2004 |

(Continued)

OTHER PUBLICATIONS

European Patent Office, International Search Report with Written Opinion issued in PCT/EP2017/063010, dated Jul. 26, 2017, 11 pages, European Patent Office, Rijswijk, Netherlands.

*Primary Examiner* — Edwin A Young
(74) *Attorney, Agent, or Firm* — McCoy Russell LLP

(57) ABSTRACT

A method of shifting a vehicle transmission including a first clutching device and a second clutching device is described. At least a portion of the first clutching device is coupled with or configured to be coupled with at least a portion of the second clutching device. The method may include the steps of engaging the second clutching device, where engaging the second clutching device includes controlling a state of the second clutching device by changing a state of the first clutching device. A transmission controller and a vehicle driveline are also described.

20 Claims, 8 Drawing Sheets

(56) References Cited

U.S. PATENT DOCUMENTS

| | | | |
|---|---|---|---|
| 4,774,857 A * | 10/1988 | Heine | F16H 3/56 |
| | | | 192/12 C |
| 4,855,913 A | 8/1989 | Brekkestran | |
| 5,547,436 A * | 8/1996 | Hayabuchi | F16H 61/20 |
| | | | 475/120 |
| 5,853,076 A | 12/1998 | Mckee | |
| 6,341,552 B1 | 1/2002 | Potter | |
| 6,761,600 B2 | 7/2004 | Daus | |
| 6,789,658 B2 | 9/2004 | Busold | |
| 8,662,272 B2 | 3/2014 | Martin | |
| 8,739,950 B2 | 6/2014 | Lundberg | |
| 9,109,645 B2 | 8/2015 | Versteyhe | |
| 2004/0122577 A1 | 6/2004 | Ford | |
| 2005/0283297 A1 | 12/2005 | Surianarayanan | |
| 2007/0199794 A1 | 8/2007 | Miyazaki | |
| 2008/0190729 A1 | 8/2008 | Stehr | |
| 2009/0042692 A1 * | 2/2009 | Fujimoto | F16H 61/688 |
| | | | 477/86 |
| 2009/0299583 A1 | 12/2009 | Mark | |
| 2010/0100280 A1 | 4/2010 | Flynn | |
| 2011/0112737 A1 | 5/2011 | Neelakantan | |
| 2014/0277978 A1 | 9/2014 | Versteyhe | |
| 2014/0364274 A1 | 12/2014 | Lorentz | |
| 2015/0292616 A1 | 10/2015 | Monajemi | |

FOREIGN PATENT DOCUMENTS

| | | |
|---|---|---|
| EP | 2458249 | 5/2012 |
| WO | 2013005674 | 1/2013 |
| WO | 2013029058 | 2/2013 |

\* cited by examiner

METHOD OF SHIFTING A VEHICLE TRANSMISSION

BACKGROUND

The present document primarily relates to a method of shifting a vehicle transmission, to a transmission controller for controlling a vehicle transmission, and to a vehicle driveline including a transmission and a transmission controller.

In a vehicle, in particular in an off-highway vehicle such as a wheel loader, a backhoe loader, a forklift truck, a mining vehicle, a tractor or the like, power and/or torque transferred between a power source of the vehicle such as a combustion engine or an electric engine and a vehicle output such as a drive axle or one or more wheels should be transmitted through the driveline in a preferably smooth manner including during a gear shift in order to provide good operability and maneuverability and to guarantee a good vehicle performance.

SUMMARY

Thus, it is an object of the presently proposed subject-matter to devise a method of shifting a vehicle transmission which provides a preferably smooth and continuous power flow through the vehicle driveline when shifting gears.

This object is solved by a method according to claim 1, by a transmission controller configured to perform this method, and by a vehicle driveline comprising said transmission controller. Special embodiments are described in the dependent claims.

Thus, a method of shifting a vehicle transmission is presently proposed. The transmission includes a first clutching device and a second clutching device, wherein at least a portion of the first clutching device is coupled with or configured to be coupled with at least a portion of the second clutching device, for example mechanically through one or more shafts, one or more gears, or one or more clutches. The method including the steps:

engaging the second clutching device, wherein engaging the second clutching device includes controlling a state of the second clutching device by changing a state of the first clutching device.

Making use of the coupling between the first and the second clutching device for controlling a state of the second clutching device by way of changing and/or controlling a state of the first clutching device opens up new pathways for controlling the shifting process. This may result in a faster, smoother and more efficient shifting process. The state of the first clutching device that is changed as part of the control procedure aimed at controlling the state of the second clutching device may include an engagement pressure in the first clutching device or a speed of an input shaft of the first clutching device, for example. The state of the second clutching device that is controlled by changing the state of the first clutching device may include a slip speed of the second clutching device, an engagement pressure in the second clutching device or a clutch shaft speed of the second clutching device, for example.

The method may further include disengaging the first clutching device. That is, usually the first clutching device is transferred from an engaged state to a disengaged state during the shifting procedure, while the second clutching device is transferred from a disengaged state to an engaged state.

While the state of the second clutching device is controlled by changing the state of the first clutching device, no torque and/or no power may be transferred through the second clutching device.

Changing the state of the first clutching device may include changing an engagement pressure of the first clutching device, in particular lowering an engagement pressure of the first clutching device. Additionally or alternatively, changing the state of the first clutching device may include changing an input speed and/or an output speed of the first clutching device.

Controlling the state of the second clutching device by changing a state of the first clutching device may include executing a first feedback control procedure. The first feedback control procedure may comprise using an engagement pressure and/or an input speed of the first clutching device as the first control variable. Additionally or alternatively, the first feedback control procedure may comprise using a slip speed and/or an engagement pressure of the second clutching device as the first process variable. The slip speed is the difference between the rotational speed of the clutch input and the clutch output: $n_{slip}=n_{in}-n_{out}$. Thus, when absolute speed values are used a positive slip speed indicates that torque is being transferred or, upon engaging the clutching device, may be transferred from the clutch input to the clutch output. A negative slip speed indicates that torque is being transferred or, upon engaging the clutching device, may be transferred from the clutch output to the clutch input.

The method may further include the steps:

determining a first torque transmission direction between a power source of the vehicle and the transmission of the vehicle, wherein the first torque transmission direction is one of (i) torque transmission towards the power source and (ii) torque transmission towards a vehicle output;

determining a second torque transmission direction between an input and an output of the second clutching device based on a current state of the second clutching device, wherein the input of the second clutching device is coupled or selectively coupled with the power source and wherein the output of the second clutching device is drivingly engaged with or selectively drivingly engaged with the vehicle output, wherein the second torque transmission direction is one of (i) torque transmission towards the power source and (ii) torque transmission towards the vehicle output;

comparing the first torque transmission direction and the second torque transmission direction; and controlling the state of the second clutching device based on the outcome of the comparison.

For example, the step of controlling a state of the second clutching device by changing a state of the first clutching device may be carried out only if the first torque transmission direction and the second torque transmission direction are found to be equal.

Determining the first torque transmission direction may include determining a speed ratio between a turbine portion and an impeller portion of a torque converter coupling or selectively coupling the power source with the transmission. Additionally or alternatively, determining the first torque transmission direction may include determining a magnitude and/or a direction of a torsional deflection of a shaft coupling the power source with the transmission.

Similarly, determining the second torque transmission direction may include determining a current speed and/or a rotational direction of the input of the second clutching device and determining a current speed and/or a rotational direction of the output of the second clutching device.

If the outcome of the above-described comparison is that the first torque transmission direction and the second torque transmission direction oppose one another, the step of controlling the state of the second clutching device by changing a state of the first clutching device may include reversing the second torque transmission direction, for example by reversing a sign of a slip speed of the second clutching device.

The method may further include the step of increasing an engagement pressure of the second clutching device by executing a first feedforward control procedure using a first feedforward engagement pressure profile for the second clutching device. The first feedforward profile may include an adaptive end point. The first feedforward profile may be determined based on a current input torque of the second clutching device.

The method may further include decreasing an engagement pressure of the first clutching device by executing at least one of:
 a second feedback control procedure using a slip speed of the first clutching device as the second process variable and using the engagement pressure of the first clutching device as the second control variable; and
 a second feedforward control procedure using a second feedforward engagement pressure profile for the first clutching device.

Decreasing the engagement pressure of the first clutching device and/or the increasing the engagement pressure of the second clutching device may be performed if or once the first torque transmission direction equals the second torque transmission direction.

The above-mentioned feedforward pressure profile/s is/may be reduced by a mean dynamic pressure accounting for a dynamic pressure building up in the first and/or the second clutching device due to a rotation of the clutch shaft, wherein the mean dynamic pressure $\overline{P}_c$ is preferably computed according to:

$$\overline{P}_c = \frac{1}{4}\rho\omega^2(R_o^2 + R_i^2 - 2R_p^2),$$

where ω is an angular speed of the clutch shaft, $R_i$, $R_o$, $R_p$ are local, inner, outer and oil-line pipe radii of the clutch piston, and ρ is the density of the oil (automatic transmission oil) inside the transmission.

Furthermore, a transmission controller for controlling a vehicle transmission is presently propose, wherein the transmission controller is configured to carry out the above-described method.

The presently proposed vehicle driveline, comprises:
 a power source;
 a transmission drivingly engaged or selectively drivingly engaged with the power source;
a vehicle output drivingly engaged or selectively drivingly engaged with the transmission; and
 the above-mentioned transmission controller.

The transmission includes a first clutching device having a first input and a first output, and a second clutching device having a second input and a second output, wherein the first input is drivingly engaged with the second input and wherein the first output is drivingly engaged with the second output.

The driveline may further include a fluid coupling device, in particular a torque converter, the fluid coupling device coupling or selectively coupling the power source with the transmission, in particular with the first input and the second input.

BRIEF DESCRIPTION OF THE DRAWINGS

The above as well as other advantages of the presently proposed subject-matter will become readily apparent to those skilled in the art from the following detailed description when considered in the light of the accompanying drawings in which.

DETAILED DESCRIPTION

Figure 1:
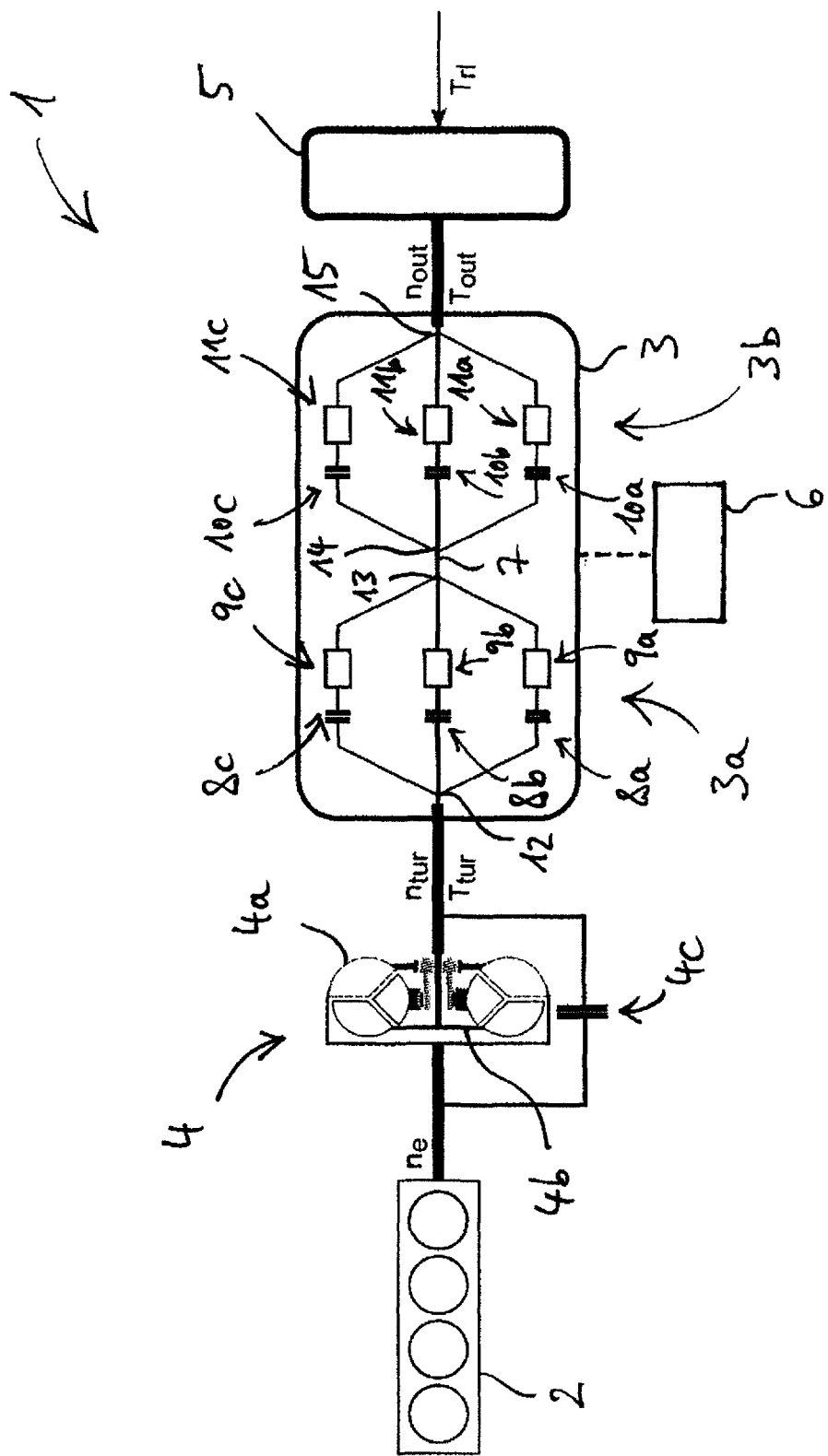
FIG. 1 shows an embodiment of the presently proposed vehicle driveline, wherein the driveline includes a transmission and a controller for controlling the transmission.

FIG. 1 shows an embodiment of a driveline 1. The driveline 1 comprises a power source 2 such as a combustion engine or an electric engine, a transmission 3, a torque converter 4, a vehicle output or output inertia 5, and a transmission controller 6 in communication with the transmission 3 for controlling the transmission 3. The transmission 3 is coupled or selectively coupled to the power source 2 through the torque converter 4. The torque converter 4 comprises an impeller portion 4a coupled to the power source 2 and a turbine portion 4b coupled to the transmission 3. Typically, the torque converter 4 further includes a stator portion (not shown). A lockup clutch 4c is configured to selectively lock the impeller portion 4a to the turbine portion 4b of the torque converter 4, for example to avoid or reduce losses. The transmission 3 is furthermore drivingly engaged or selectively drivingly engaged with the vehicle output 5. The vehicle output 5 may include at least one of a drive shaft, a drive axle, a differential, a final drive, and one or more wheels, for example.

The transmission 3 comprises a first transmission stage 3a and a second transmission stage 3b coupled to one another through a drum shaft 7. The first transmission stage 3a comprises clutching devices 8a-c, and speed ratios 9a-c, respectively, wherein the clutching devices 8a-c and the speed ratios 9a-c are arranged in parallel between the turbine 4b and the drum shaft 7 to provide selective driving engagement between the turbine 4b and the drum shaft 7, respectively. Similarly, the second transmission stage 3b comprises clutching devices 10a-c, and speed ratios 11a-c, respectively, wherein the clutching devices 10a-c and the speed ratios 11a-c are arranged in parallel between the drum shaft 7 and the vehicle output 5 to provide selective driving engagement between the drum shaft 7 and the vehicle output 5, respectively. It is understood that the speed ratios 9a-c may provide different drive ratios and/or different relative directions of rotation between the turbine 4b and the drum shaft 7. Similarly, it is understood that the speed ratios 11a-c may provide different drive ratios and/or different relative directions of rotation between the drum shaft 7 and the vehicle output 5.

Each of the clutching devices 8a-c, 10a-c have an input facing the power source 2, and an output facing the vehicle output 5. The inputs of the clutching devices 8a-c of the first transmission stage 3a are mechanically coupled to one another, as indicated at 12. That is, rotation of one of the inputs of the clutching devices 8a-c causes rotation of the other inputs of the clutching devices 8a-c. The outputs of the clutching devices 8a-c of the first transmission stage 3a are mechanically coupled to one another, as indicated at 13. That is, rotation of one of the outputs of the clutching devices 8a-c causes rotation of the other outputs of the clutching devices 8a-c. The inputs of the clutching devices 10a-c of the second transmission stage 3b are mechanically coupled to one another, as indicated at 14. That is, rotation of one of the inputs of the clutching devices 10a-c causes rotation of the other inputs of the clutching devices 10a-c. The outputs of the clutching devices 10a-c of the second transmission stage 3b are mechanically coupled to one another, as indicated at 15. That is, rotation of one of the outputs of the clutching devices 10a-c causes rotation of the other outputs of the clutching devices 10a-c.

The driveline 1 may further include one or more speed sensors (not shown) in communication with the controller 6, for example for measuring some or all of: a speed and/or a direction of rotation of the impeller portion 4a, of the turbine portion 4b, the inputs/outputs of the clutching devices 8a-c, 10a-c and of the drum shaft 7.

It is understood that the driveline 1 depicted in FIG. 1 may have only one transmission stage or three or more transmission stages. It is furthermore understood that the transmission stages of the driveline 1 may have fewer or more than three clutching devices and drive ratios. However, the driveline 1 includes at least one transmission stage having at least two clutching devices arranged in parallel and coupled to one another.

Some or all of the clutching devices 8a-c, 10a-c may be configured as hydraulic clutches such as wet plate clutches which may be actuated by varying a hydraulic pressure in a clutch chamber. Hydraulic clutches are well known in the art of automotive transmissions. Also, some or all of the clutching devices 8a-c, 10a-c may be configured as electronically actuatable clutches. Electronically actuatable clutches are likewise well known in the art of automotive transmissions. In both cases, the input and the output of a clutching device may be engaged or locked by increasing an engagement pressure inside the clutching device, for example above a first threshold pressure. Conversely, the input and the output of a clutching device may be disengaged by decreasing or lowering the engagement pressure inside the clutching device, for example below a second threshold pressure.

Torque and/or power may be transmitted between the power source 2 and the vehicle output 5 by closing one clutching device in each of the transmission stages 3a, 3b. A gear shift typically includes handing over torque transmission between two clutching devices in at least one of the transmission stages 3a, 3b, respectively. For example, shifting the transmission 3 may include transferring the clutching device 8a in the first transmission stage 3a from an engaged state to a disengaged state, and transferring the clutching device 8b in the same transmission stage 3a from a disengaged state to art engaged state, wherein the engagement and the disengagement process typically overlap in time, for example at least partially. Each combination of two closed clutching devices (one gear set) has a different speed ratio and by closing the corresponding clutching devices or clutches, this speed ratio is selected.

This presently proposed method relates to the actuation pressure profiles used or employed to operate the clutches 8a-c, 10a-c in the transmission 3 to perform a shift or a power shift between two clutches in the same stage 3a, 3b, and, more precisely, may furthermore relate to the problem of how to cope with the inherent variability which may occur during such a gearshift.

A shift or a power shift may usually be decomposed into at least three successive phases. For an upshift: pressurizing (e. g. filling) the clutch to be engaged (also denoted oncoming clutch), a torque phase, and an inertia phase. For a downshift, the two latter phases will typically be inverted, and after the pressurizing phase (or fill phase in the case of a hydraulic clutch) there will usually be an additional phase termed torque direction phase which aims at making the direction of the torque flowing into the transmission 3 and the direction of the torque flowing out of the transmission 3 equal. In other words, the presently proposed method addresses the decision whether the first or the second of the above mentioned sequences is employed during a gear shift based on (an estimation of) the sign of the torque flowing through the transmission.

Although applied here to an off-highway application, the techniques described in this document may be employed for controlling any device making use of actuatable clutches. These clutches may be wet-plate clutches actuated with electro-hydraulic proportional valves or by using a ball ramp with an electric actuator, for example.

Given the layout of the transmission 3 depicted in FIG. 1, there typically are many of possible mechanical paths between the power source 1 and the vehicle output 5, and there may be even more possibilities of shifting from one mechanical transmission path to another.

However, there are some requirements which should preferably be fulfilled for a successful gear shift. For example, the torque flow of torque between the power source 1 and the vehicle output 5 should preferably not be interrupted or the torque flow into and out of the transmission 3 should preferably not change direction during the shift. Another requirement is a high shift quality under the influence of changing external factors. Here, the quality of the shift is related to the number of discontinuities of the driveline output torque (also called jerk), since it relates immediately to the vehicle acceleration. Indeed, from the driver perspective, an acceleration discontinuity or interruption occurring during a shift may be experienced as a low quality shift.

Assume there is a closed mechanical path from the torque converter (also abbreviated as TC) 4 to the vehicle output 5. This means that in each stage 3a, 3b of the transmission 3 only one of the clutches 8a-c, 9a-c, respectively, is closed. The amount of transferred torque and its direction may typically be described by a set of dynamic equations based on the layout of the transmission 3 and possibly additional specifications. When a gear shift is requested, the direction of the flow of torque transmitted via the sticking off-going clutch is very important, wherein the term "off-going clutch" relates to the clutching device which is closed or engaged at the beginning of the shifting process, for example the clutch 8a, and which is intended to be opened or disengaged during the course of the shifting process. It directly relates to the direction of the flow of torque transmitted via the TC 4 and only the latter will therefore be used. If pressure is applied to the (slipping) on-coming clutch, for example to the clutch 8b, the direction of the flow of torque transmitted or to be transmitted via the on-coming clutch 8b is determined by the speeds and rotational directions of the input and of the output of the on-coming clutch 8b. If the direction of the flow of torque transmitted or to be transmitted via the on-coming clutch 8b is equal to the direction of the flow of torque transmitted via the TC 4, pressure may be applied to the on-coming clutch 8b without any problem. If the directions of the flow of torque transmitted via the TC 4 and transmitted or to be transmitted via the on-coming clutch 8b are not equal, however, pressurizing the on-coming clutch 8b may result in an unsmooth shift.

The optimal pressure profile to apply to both the off-going clutch 8a and the on-coming clutch 8b may depend on a number of conditions such as: temperature of the lubricant (typically oil), the type of the transmission fluid, the load of the vehicle, a road condition, driver acceleration pedal position, age of the transmission, wear of the clutches, etc. Some of these effects are slow varying processes over the transmission lifetime, such as wear; others are fast varying such as oil temperature or road conditions.

In order to cope with these different conditions, the presently proposed shifting method may include a mix of open-loop, feedforward, feedback, and learning control processes. As the operation of a gear shift may be influenced by a number of factors and/or conditions, it is not trivial to obtain a smooth and fast gear shift in all situations without relying on a complex controller logic. Although shifts are variable, it is preferred to implement a generic shift strategy which works with a large number of shift types or preferably with all shift types. For this purpose, the goal is to implement a generic strategy which is preferably applicable to all possible shifts.

The presently proposed method provides a solution to the problem of executing a gear shift in a transmission under varying conditions. The embodiment of the presently propose method described herein comprises a procedural logic for both the on-coming clutch 8b and the off-going clutch 8a which is executed in parallel. Within this logic flow, several control procedures may be carried out which aid in coping with variable conditions during a shift. These control procedures may include at least one of a feedforward, feedback or open loop control procedure.

Figure 2:
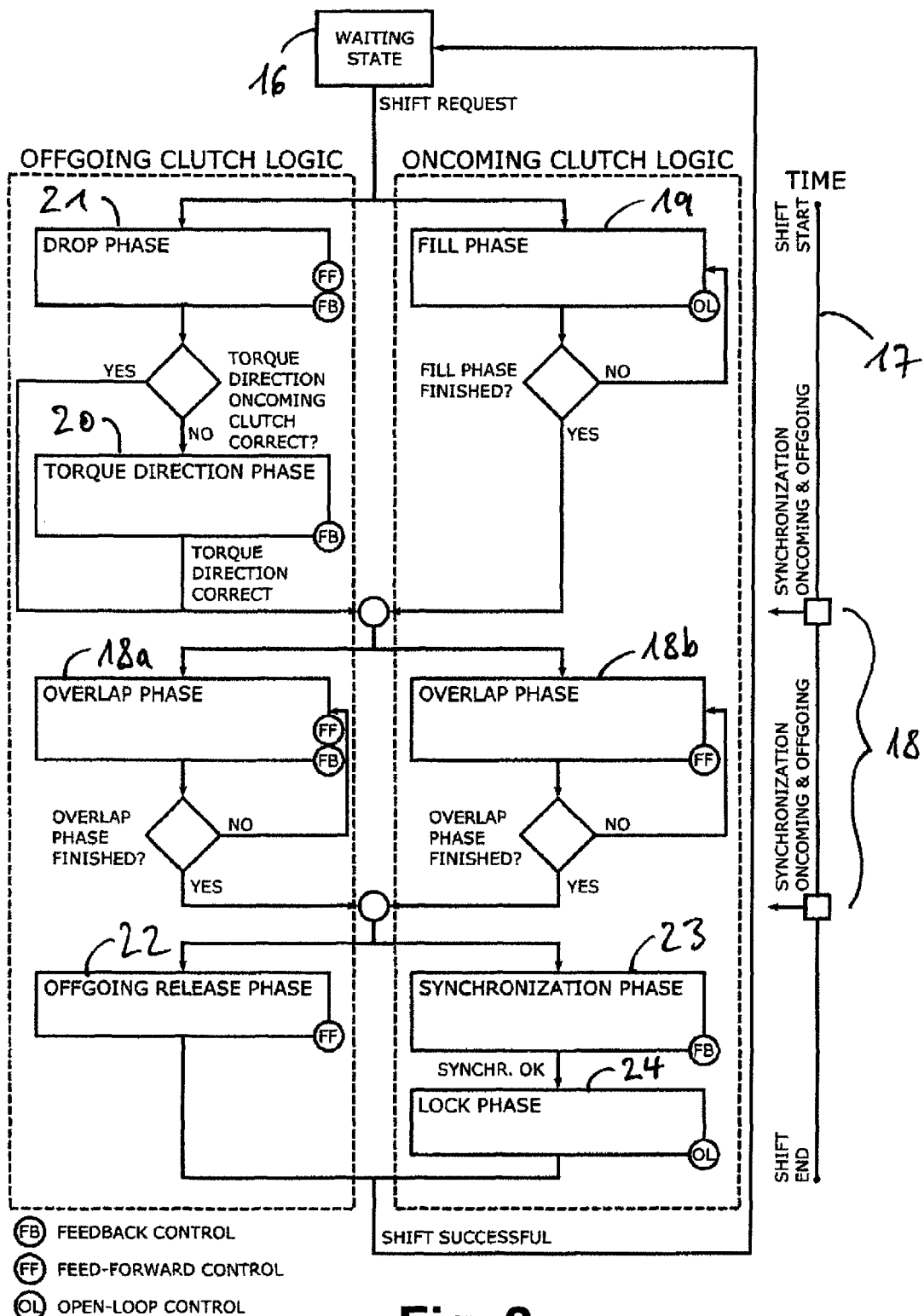
FIG. 2 shows a flow diagram illustrating different phases of an embodiment of a method of shifting the transmission of FIG. 1, the shifting procedure including handing over a transmission of torque from an off-going clutch to an on-coming clutch.

For these different shifts to be executed successfully specific requirements should preferably be met. Some shift types, for example, may require the torque direction to change whereas others do not. FIG. 2 shows a flowchart depicting an embodiment of a generic shift strategy in accordance with the presently proposed method. It provides the shift logic for both the on-coming clutch 8b and the off-going clutch 8a. Here and in the following recurring features are designated by the same reference signs.

When the controller 6 does not receive a shift request, the logic is in the WAITING STATE 16 and the currently actuated clutches remain pressurized. When a SHIFT REQUEST is received, the controller 6 starts the logic sequence for both the on-coming clutch 8b and the off-going clutch 8a start at the same time. In FIG. 2, the OFF-GOING CLUTCH LOGIC is depicted on the left hand side, and the ON-COMING CLUTCH LOGIC is depicted on the right hand side. At the right end of FIG. 2, a TIME bar 17 is depicted indicating the points in time at which the off-going clutch 8a and the on-coming clutch 8b are synchronized.

Both the off-going clutch 8a and the on-coming clutch 8b have to be synchronized before the procedure may proceed to the next stage. The time bar 17 indicates that:

the controller 6 starts both ON-COMING CLUTCH LOGIC and OFF-GOING CLUTCH LOGIC start at the same time after a SHIFT REQUEST;

the controller 6 starts both the OVERLAP PHASE 18b for the on-coming clutch 8b and the OVERLAP PHASE 18a for the off-going clutch 8a at the same time; and The controller 6 ends both the OVERLAP PHASE 18b for the on-coming clutch 8b and the OVERLAP PHASE 18a for the off-going clutch 8a at the same time.

The controller 6 starts the on-coming clutch logic with the FILL PHASE 19. During the fill phase 19 the controller 6 pressurizes or fills the on-coming clutch 8b to place the on-coming clutch in a state in which torque may be transferred through the clutch. The controller 6 causes the on-coming clutch 8b to be filled with transmission oil with a certain set pressure profile. This is an open loop control. The controller 6 ends the fill pulse with the initiation of the stabilization phase during which the controller 6 holds the pressure of the on-coming clutch 8b at the kiss pressure, where the term kiss pressure refers to a value of the clutch pressure at which the input and the output of the clutch are barely in contact but no torque may be transferred through the clutch. The controller 6 keeps the pressure at the kiss pressure until the controller ends the torque direction phase of the off-going clutch 8a (if the controller 6 executes the torque direction phase 20).

The controller 6 starts the off-going clutch logic with the DROP PHASE 21. During the drop phase 21 the controller 6 decreases the pressure of the off-going clutch 8a from its initial value to a value where the clutch still sticks. Although this is a feed-forward control process, the controller 6 may switch the control logic to a feedback control process if the controller 6 detects that the off-going clutch 8a is slipping.

When the pressure of the off-going clutch 8a has dropped, the controller 6 checks whether the direction of the flow of torque transmitted or to be transmitted by the on-coming clutch 8a matches the direction of the flow of torque transmitted between the power source 1 and the transmission 3. If it does, the controller 6 initiates the OVERLAP PHASE 18 for both the on-coming clutch 8b and for the off-going clutch 8a. If it does not, the controller 6 initiates the TORQUE DIRECTION PHASE 20. During this phase, the controller 6 controls the pressure of the off-going clutch 8a is changed to control the slip of the on-coming clutch 8b in a feedback control process using the slip speed of the on-coming clutch 8b as the process variable and using the pressure of the off-going clutch 8a as the control variable. The controller 6 terminates the torque direction phase 20 when direction of the flow of torque transmitted via the on-coming clutch 8b (or to be transmitted upon its closing) equals the direction of the flow of torque transmitted via the TC 4 such that the controller 6 may initiate the OVERLAP PHASE 18.

The controller 6 then initiates the OVERLAP PHASE 18b for the on-coming clutch 8b and the OVERLAP PHASE 18 a for the off-going clutch 8a at the same time. During the OVERLAP PHASE 18 the controller 6 causes the off-going clutch 8a to hand the transmission of torque between the power source 1 and the vehicle output 5 over to the on-coming clutch 8b. The overlap phase for the on-coming clutch 8b is a feed-forward control process while the overlap phase for the off-going clutch 8a is both a feed-forward and feedback control process.

After the overlap phase 18, the controller 6 causes the off-going clutch 8a to enter the OFF-GOING RELEASE PHASE 22 during which the controller 6 decreases the pressure of the off-going clutch 8a from its initial value to its minimum value by means of a feed-forward control process. The controller 6 controls the on-coming clutch 8b to enter the SYNCHRONIZATION PHASE 23. During the SYNCHRONIZATION PHASE the controller 6 synchronizes the on-coming clutch 8b using a feedback control procedure using the slip speed of the on-coming clutch 8b as the process variable and the pressure in the on-coming clutch 8b as the control variable. After the controller 6 terminates the synchronization of the on-coming clutch 6, the controller 6 initiates the LOCK PHASE during which the controller 6 increases the pressure of the on-coming clutch 8b from its initial value to its maximum value in an open loop control process.

When the controller 6 has decreased the pressure of the off-going clutch 8a to its minimum pressure and has increased the pressure of the on-coming clutch 8b to its maximum pressure, the controller 6 determines that the SHIFT has been executed SUCCESSFULLY and returns the logic to the WAITING STATE 16.

The above-described generic shift approach is applicable for all different kinds of shifts except for double swaps.

Figure 3:
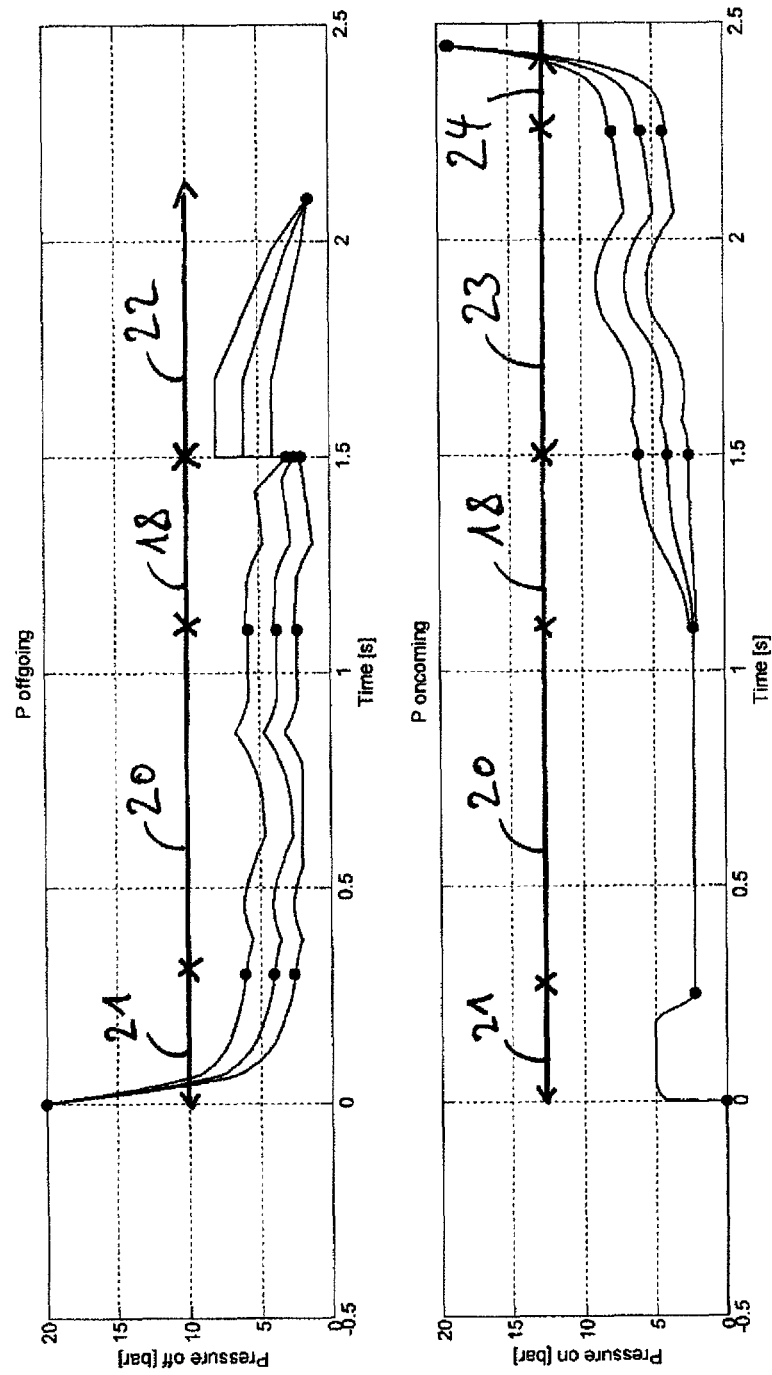
FIG. 3 shows embodiments of pressure profiles in an off-going clutch and in an on-coming clutch during the shifting procedure of FIG. 2.

In the following the different phases of the method as depicted in FIG. 2 are described in somewhat more detail. Typical pressure profiles in the off-going clutch 8a and in the on-coming clutch 8a during the course of the method schematically depicted in FIG. 2 are illustrated in FIG. 3. The beginning and the end of the different phases shown in FIG. 2 are highlighted in FIG. 3.

Drop Phase

During the drop phase 21, the controller 6 decreases the pressure of the off-going clutch 8a to a value at which the clutch 8a is just able to transfer the required torque, using a feed-forward profile. The controller 6 may read this pressure value from a pressure-torque table using estimated transferred torque through the torque converter 4. A way to estimate the torque is described further below.

Figure 4:
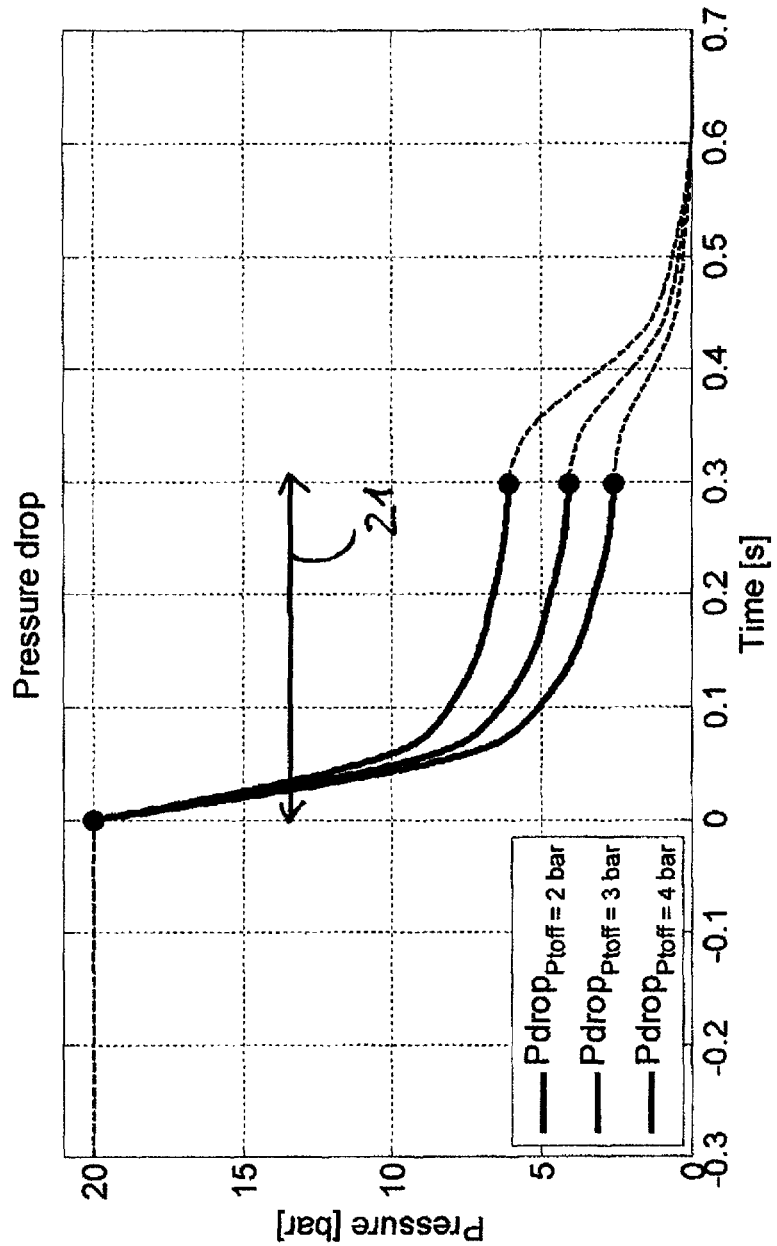
FIG. 4 shows embodiments of pressure profiles in the off-going clutch during a pressure drop phase.

When the controller 6 has executed this control procedure to the end, the clutch plates of the clutch 8a are typically still touching and not slipping. If the controller 6 detects any slip during the execution of the feed-forward profile, however, the controller 6 initiates a feedback control process which adapts the pressure of the clutch 8a such that the off-going clutch 8a remains in a low-slip mode. Embodiments of typical feedforward pressure profiles used by the controller 6 to control the off-going clutch 8a during the drop phase 21 are depicted in FIG. 4.

Fill Phase

The controller 6 executes the fill phase 19 to effectively fill the on-coming clutch 8b with transmission oil. At the end of this phase, the clutch plates should be right at their point of contact without being in a position to transfer torque. This point is called the kiss point. The pressure required to hold the clutch 8b in this position is called the kiss pressure. The amount of time needed to fill the clutch and its feed lines with oil is called the fill time.

Figure 5:
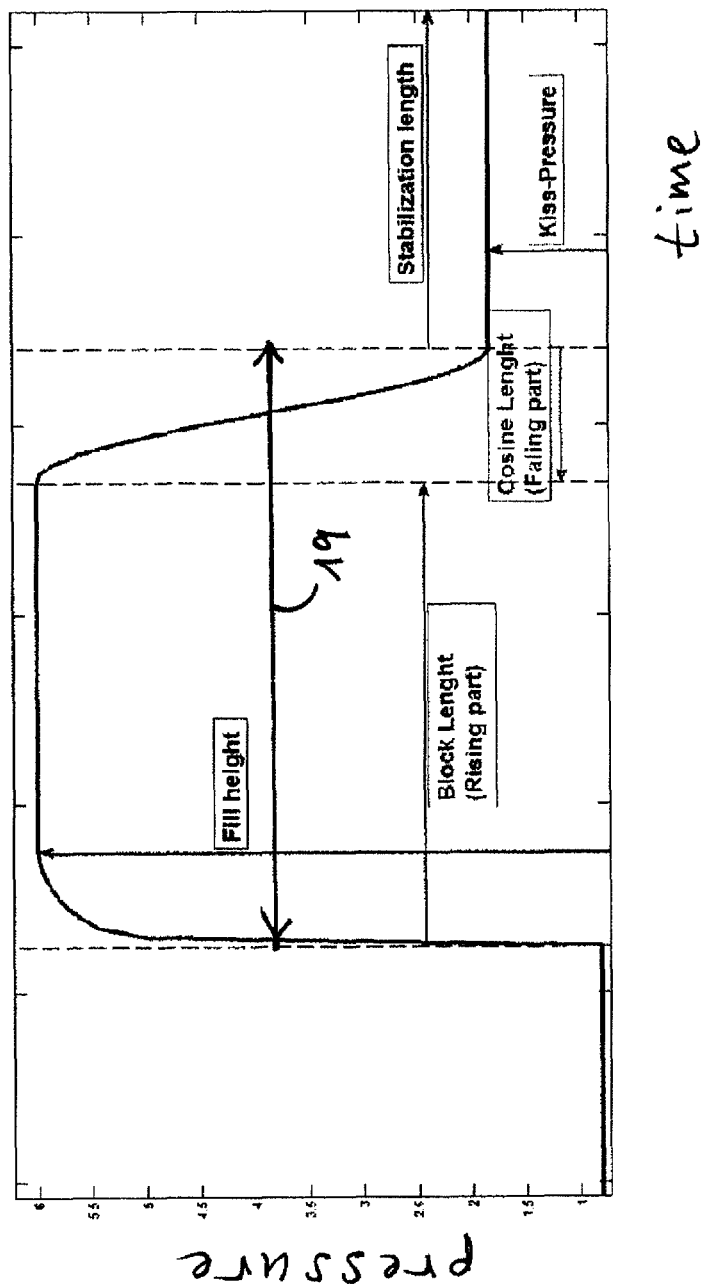
FIG. 5 shows embodiments of pressure profiles in the on-coming clutch during a fill phase.

The control procedure applied by the controller 6 during the fill phase 19 is an open-loop control, where the above-mentioned kiss pressure and the fill time are the only two variables. These variables are read from a look-up table. Further details may be inferred from the documents U.S. Pat. No. 9,109,645 and US2014277978 which are incorporated herein by reference in their entirety. An embodiment of a typical pressure profile applied by the controller 6 during the fill phase 19 in the on-coming clutch 8b is depicted in FIG. 5.

Torque Direction Phase

The gear shift process can typically be grouped into two different shift types. The classification usually depends on the states of the system and, more precisely, on the direction of the flow of torque transmitted through the TC 4 and on the direction of the flow of torque transmitted or to be transmitted through the on-coming clutch 8b.

If the controller 6 determines that the above-mentioned torque flow directions are equal, the controller 6 skips the torque direction phase 20. However, if the controller 6 determines that the above-mentioned torque flow directions are opposed to one another, the controller 6 initiates the torque direction phase 20 in order to change the slip direction of the on-coming clutch 8b. As long as this has not yet happened, pressurizing the on-coming clutch 8b would result in negative torque being applied to the on-coming clutch 8b. However, due to the coupling 12, 13 between the inputs and the outputs of the off-going clutch 8a and the on-coming clutch 8b, the controller 6 may reverse the slip speed of the on-coming clutch 8b by changing the pressure in the off-going clutch 8a. As the controller 6 reduces the pressure in the off-going clutch 8a, the clutch 8a transfers less torque, resulting in an acceleration of the input of the off-going clutch 8a. In this manner the controller 6 may reduce the negative slip speed of the on-coming clutch 8b until the slip speed of the on-coming clutch 8b is positive.

However, with the pressure in the off-going clutch 8a reduced, the output torque of the off-going clutch 8a is likewise reduced. Thus, a balance between the following two goals should preferably be achieved:
- the off-going clutch pressure should be decreased to reverse the slip of the on-coming clutch as quickly as possible; and
- the output torque should preferably be maintained to avoid a torque dip.

The controller 6 may control the off-going clutch 8b to follow a slip speed reference—a slip speed profile going from the current value to a smaller value with opposite sign—so that a balance between time and output torque can be achieved. To that end, the controller 6 may control the slip speed of the off-going clutch 8a to reduce the pressure in the off-going clutch 8a and may later increase it again to follow this trajectory. When the controller 6 has reached this condition (slip speed sign is reversed), applying pressure on the on-coming clutch 8b results in positive torque. This is the moment when the controller 6 may initiate the overlap phase 18 during which the on-coming clutch 8b takes over the torque of the off-going clutch 8a.

Direction of the Flow of Torque Transmitted Via the TC

As mentioned above, the direction of the flow of torque transmitted via the TC 4 typically plays an important role during the shifting process. Different methods can be used to measure or estimate this direction. The method used does not matter as long as it yields a sufficiently accurate estimate of the input torque at the transmission 3. For example, the direction of the flow of torque transmitted via the TC 4 may be measured via one or more sensors, it may be estimated based on engine or torque converter characteristics, or it may be determined based on the dynamic equations describing the system. The method is illustrated here by making use of the torque converter characteristic.

The TC is typically well characterized by the set of equations shown here below. The $T_{p2000}$ (pump torque at pump speed of 2000 rpm) and the TR (torque ratio at which pump torque is increased to get turbine torque), as a function of the speed ratio, are commonly provided characteristics. They can simply be re-used as lookup tables as a function of the SR_TC.

$$SR_{TC} = \frac{n_{tur}}{n_e}; \quad T_p = T_{p2000}(SR_{TC}) * \frac{n_e^2}{2000^2}; \quad T_{tur} = T_p * TR(SR_{TC})$$

Direction of the Flow of Torque Transmitted Via the Slipping Clutch

The controller 6 may estimate the torque direction based on the operating point of the TC 4. Generally, the torque direction is positive (from ICE to output) for speed ratios of the torque converter $SR_{TC}$ smaller than 1. This is called the drive situation. For $SR_{TC}$>1 the torque direction is usually negative and may be termed the brake situation. Some small variations around the switch point ($SR_{TC}$=1) are possible, so it is usually preferable to get the torque by using the Tp2000 map at the actual $SR_{TC}$ and to extract the sign of the computed turbine torque. As stated above, the controller 6 may determine the torque direction based on the operating point of the TC 4.

When a new gear is selected one can determine the torque direction when this clutch is actuated in accordance with the calculation shown below. This is typically different than the slip speed definition which may also be provided.

$$n_{slip} = n_{in} - n_{out}; T_{dir} = \text{sign}(n_{in}) \cdot \text{sign}(n_{slip})$$

To reverse the torque direction of the on-coming clutch, the sign of the on-coming clutch slip speed will typically have to be reversed before the clutch starts transferring torque, for example by controlling the off-going clutch pressure.

Overlap Phase: On-Coming Clutch

During the overlap phase 18 the controller 6 typically increases the pressure in the on-coming clutch 8B to a level where the clutch may transfer all the torque coming from the torque converter 4. To this end, the controller 6 may use a feedforward profile with an adaptive end point based on the pressure-torque-relationship of the on-coming clutch 8b.

The on-coming clutch 8b is generally in slip during this phase. However, it is conceivable that the on-coming clutch 8b already starts sticking because the slip speed of the on-coming clutch 8b is small. In this situation, it is preferred that the controller 6 hold the on-coming clutch 8b closed and increase the pressure rapidly to avoid that the clutch 8b starts slipping again. The controller 6 may then end the overlap phase 18 and start the synchronization phase 23 and the lock phase 24 for the on-coming clutch 8b.

Figure 6:
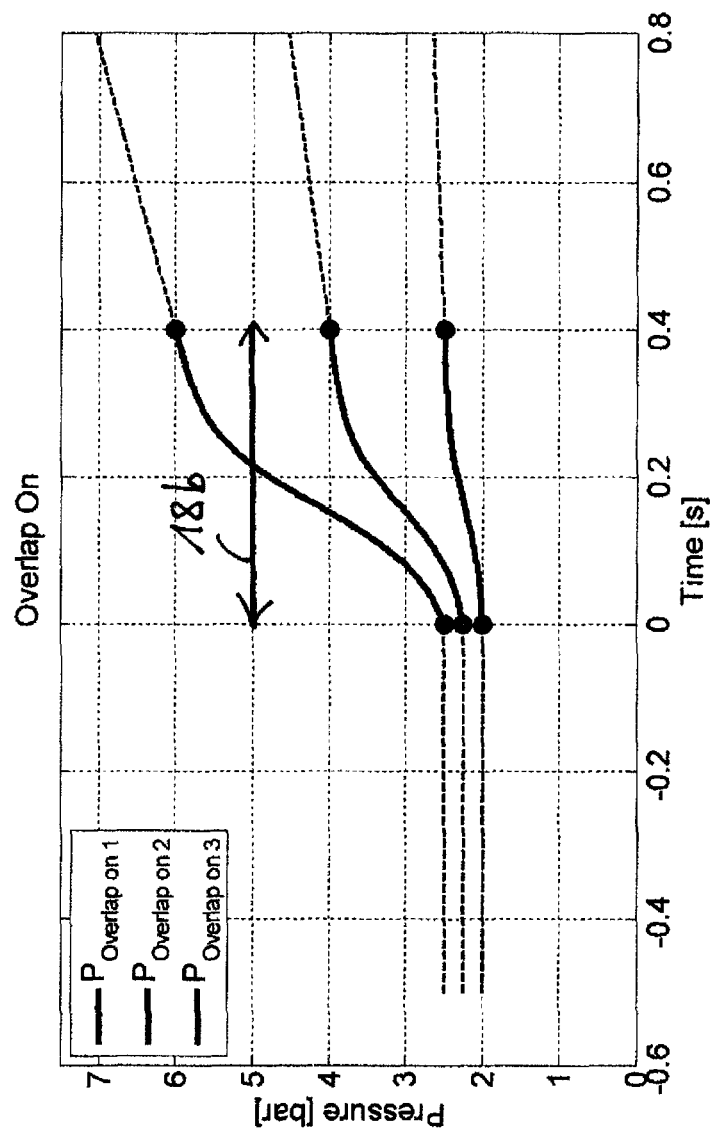
FIG. 6 shows embodiments of pressure profiles in the on-coming clutch during an overlap phase.

However, if the torque direction phase 20 was executed because the sign of slip was previously not correct and has now been corrected by the controller 6, the slip speed will typically be small already. In this case, the described condition may be ignored to proceed to complete the hand over of the torque. Embodiments of typical pressure profiles of the on-coming clutch 8b are depicted in FIG. 6.

Overlap Phase: Off-Going Clutch

The goal during this phase typically is to reduce the torque transfer through the off-going clutch 8a. This phase may be entered from two different previous phases:
from the drop phase 21 if the torque direction was correct; and
from the torque direction phase 20 if the torque direction was previously not correct but has now been corrected.

In the first case, the off-going clutch 8a is in stick or slip, depending on how it leaves the drop phase. In the second case, the clutch 8a is necessarily slipping. In both situations the controller 6 controls the off-going slip speed by using a constant slip speed reference, namely the captured off-going slip speed value at the beginning of the overlap phase 18. To be fully generic, the feedback error may be computed as follows:

$$\text{error} = (n_{s,off} - n_{s,off,capt}) * \text{sign}(T_{tur,capt}) * \text{sign}(n_{in}),$$

where $n_{s,off}$ is the off-going slip speed, $n_{s,off,capt}$ is the captured off-going slip speed at the beginning of the overlap, $T_{tur,capt}$ is the captured turbine torque at the beginning of the overlap, and $n_{in}$ is the clutch input shaft speed.

As the controller 6 increases the on-coming pressure to take over the torque, the pressure in the on-coming clutch 8b will usually affect the slip speed of the off-going clutch 8a which is feedback-controlled. The pressure in the on-coming clutch 8b may therefore also affect the pressure in the off-going clutch 8a. Indeed, as the on-coming clutch 8b takes over torque, the applied pressure of the off-going clutch 8a (when in slip) may be too high, thereby tending to synchronize the off-going clutch 8a again. Therefore, the controller 6 may reduce the pressure in the off-going clutch 8a to increase the slip speed again. Ideally, all torque has been handed over to the on-coming clutch 8b at the end of the overlap phase 18.

In the meantime, a feedforward pressure profile may be applied to the off-going clutch aiming at decreasing its pressure from the level it is at at the beginning of the phase to the clutch relief pressure.

A maximum feed-forward pressure profile may also be computed in order to force the off-going pressure to decrease in case it reaches the computed value. Theoretically, at the end of the overlap phase, the maximum pressure of the off-going clutch equals the kiss pressure. However, due to various hysteresis effects in the complete system, a pressure lower than the kiss pressure should be used. This level is called the relief pressure and may be set as a fraction of the actual kiss pressure. This usually allows directly linking the relief pressure to the kiss pressure, as the latter may varying with temperature, for example. The exit condition used to proceed to the next phase usually includes the off-going pressure reaching the relief pressure level.

Synchronization Phase

At the end of the overlap phase 18, the on-coming clutch 8b usually transfers all the torque produced by the torque converter 4 but is not necessarily synchronized yet. In this phase, the on-coming clutch 8b may be synchronized by following a smooth reference slip speed trajectory. The tracking of a slip speed reference smoothly going to zero allows performing the transition from slip to stick in a way that may naturally limit mechanical jerks.

Release Phase for the Off-Going Clutch

Usually, the goal during this phase is to bring the pressure of the off-going clutch 8a to zero and, in some situations, to hand over torque from the off-going clutch 8a to the on-coming clutch 8b.

This part typically uses a feed-forward profile that starts at the last pressure value of the overlap controller. The controller 6 may keep the pressure constant for a moment and may then goes to the relief pressure level. The controller 6 may then reduces the pressure further to zero.

Figure 7:
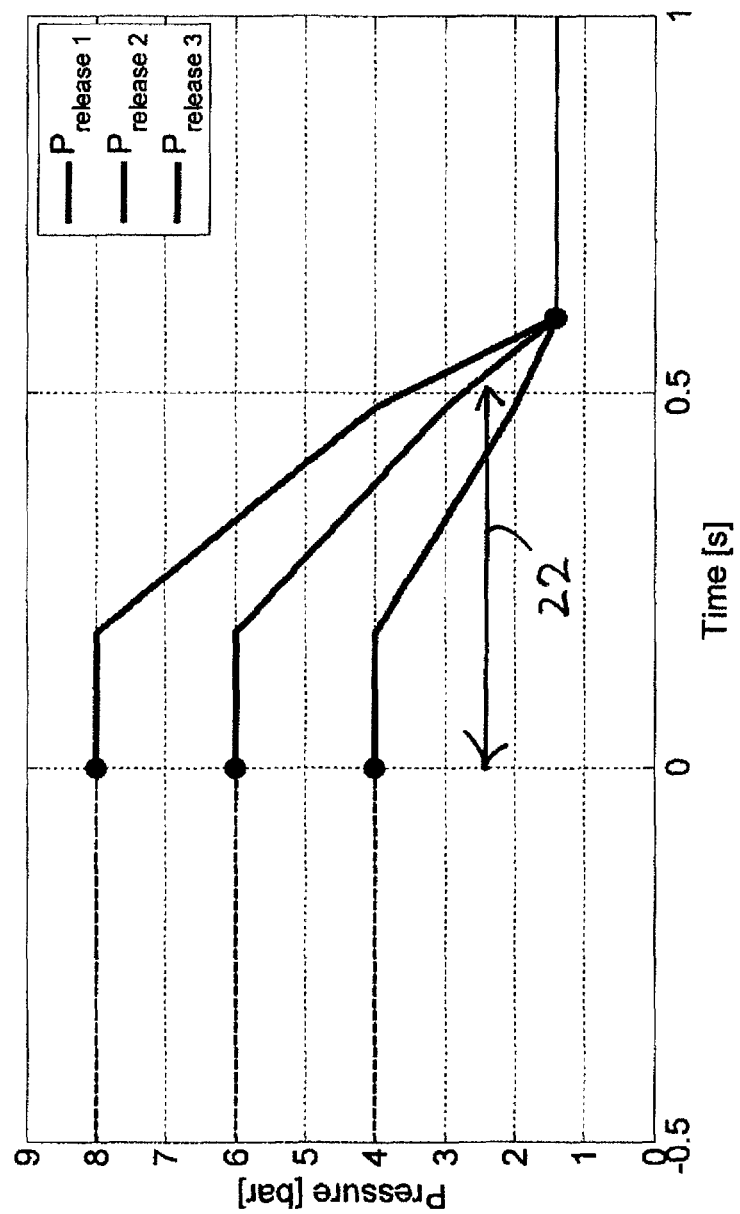
FIG. 7 shows embodiments of pressure profiles in the off-going clutch during a pressure release phase.

In most situations, the last value of the overlap is already the relief pressure. In cases where the on-coming clutch is synchronized in the overlap phase 18, the captured pressure of the off-going clutch 8a may be higher and torque must still be transferred from the off-going clutch 8a to the on-coming clutch 8b. By reducing the pressure in the off-going clutch 8a in a smooth way, torque may handed over to the on-coming clutch 8b. Therefore, this profile is preferably made smooth to cope with these cases. FIG. 7 shows embodiments of typical pressure profiles in the off-going clutch 8a during the pressure release phase.

Lock Phase

Figure 8:
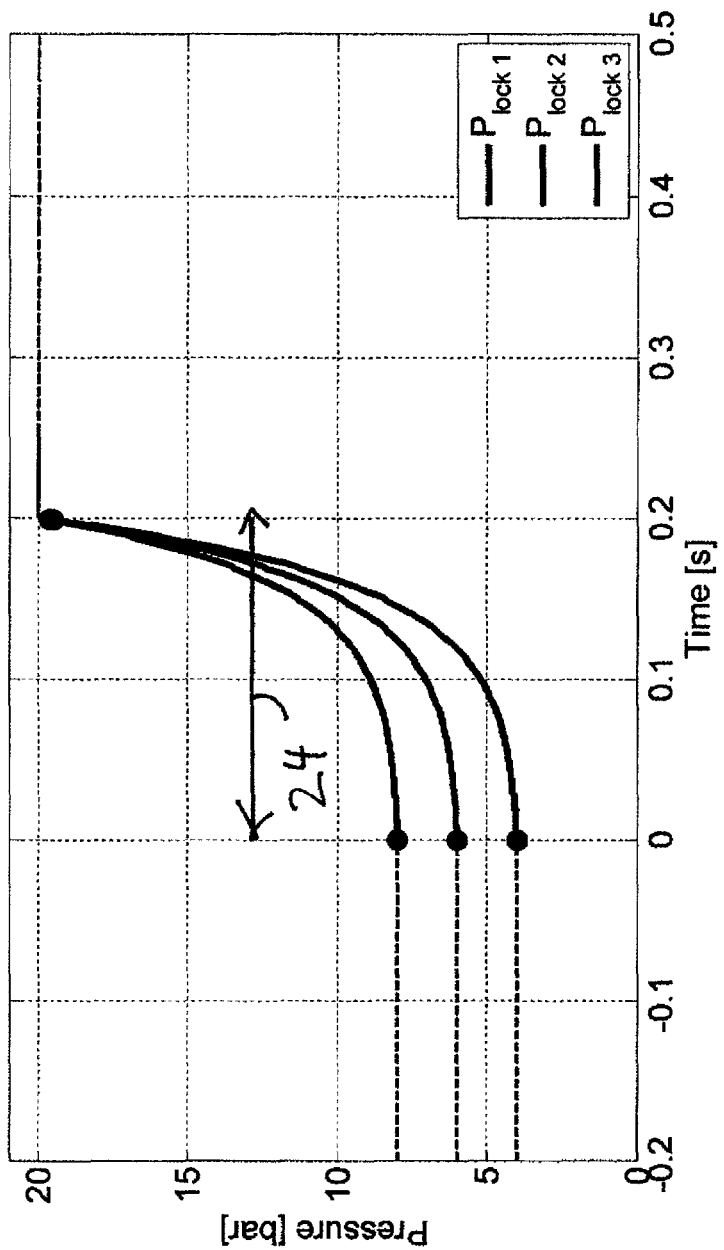
FIG. 8 shows embodiments of pressure profiles in the on-coming clutch during a lock phase.

With an open-loop control, the controller 6 may increase the pressure of the on-coming clutch 8b to the maximum pressure, typically 20 bar, locking the clutch for lossless torque transfer. FIG. 8 shows embodiments of typical pressure profiles in the on-corning clutch 8b during the lock phase.

Dynamic Pressure Compensation

In order to be able to compensate for the dynamic pressure which may build up in the clutch and which may be a function of the transmission shaft speed, clutch geometry and oil-line pressure and diameter, the controller 6 may apply the following strategy.

In all phases and on both the off-going and on-coming clutches there may be a dynamic pressure generated by the rotation of a mass of oil in the clutches. This mass rotation typically creates a force on the clutch piston due centrifugal effects. This dynamic pressure in the clutches may create disturbances during all the phases of the shift as it may create an extra pressure which may disturb the on-coming clutch pressure which may delay the opening of the off-going clutch.

To compensate for the dynamic pressure, the controller 6 may calculate an estimation in real-time during every shift and may reduce the estimated pressure value from the set pressure profile. The estimation may be made using the relation $$\overline{P}_c = \frac{1}{4}\rho\omega^2(R_o^2 + R_i^2 - 2R_p^2),$$

where ω is angular shaft speed, $\overline{P}_c$ is mean dynamic-pressure on the clutch-piston due to centrifugal force, $R_i$, $R_o$, $R_p$ are local, inner, outer and oil-line pipe radii of the clutch piston and ρ is the transmission oil (automatic transmission fluid) density. There may also be a compensation for pressure variation caused by the oil pump capacity at different engine speeds (the oil pump may be stronger at higher engine speeds). This model can be used in an LU-clutch of a torque convertor as well as in on-coming and off-going clutches to make the controller robust against different shaft speeds and oil density changes. It may furthermore take into account the geometry of the clutch-piston and the oil line diameter.

How to Handle Various Shift Types

During the shifting process the torque direction (of the TC) can change, for example due to changes in road load, application of the throttle, the nature of the shift (kinematic gear ratios). The gear shift strategy should preferably be able to cope with these situations. If we take these effects into consideration, an exhaustive list of all shift types can be made.

Different shift types are defined by two combined words such as "drive drive". The first word indicates the state of the system at the start of the shift and the second word refers to the state after the shift. "Drive" means a positive torque flow (from engine to output) and "brake" means negative torque flow from output to engine). Note that brake in this sense has no direct relation with applying the brakes of the vehicle. It refers to the contribution of the powertrain to the vehicle.

A total of 10 shift types can be defined:

1. Simple closing (closing 1 clutch without making mechanical path from TC to out).
2. Launch (Closing the clutch which makes a mechanical path from TC to out).
3. Drive Drive Upshift→Upshift with positive torque to output.
4. Drive Drive downshift→'Kickdown' for more traction.
5. Brake Brake upshift→driving downhill reducing engine speed and braking torque.
6. Brake Brake downshift→engine braking increase, downhill increase engine brake, prevent engine stall.
7. Brake drive upshift→TC>1 in lower gear and TC<1 in upper gear.
8. Brake drive downshift→TC>1 in upper gear and TC<1 in lower gear (very unlikely).
9. Drive brake downshift→TC<1 in upper gear and TC>1 in lower gear.
10. Drive brake upshiftΘTC<1 in lower gear and TC>1 in upper gear (very unlikely)

Simple Closing

There is no off-going clutch. The on-coming clutch performs the fill, synchronization and lock phase. The overlap is not needed because there is no off-going clutch. Thus in this situation the synchronization can start directly after the filling. The shift is ended with the lock phase.

Launch

There is no off-going clutch. Thus, these parts can be skipped. Typically, only the workflow for the on-coming clutch is needed. Usually, filling is needed, the overlap is not needed because there is no off-going clutch. Therefore, in this situation the synchronization can start directly after the filling. The shift may terminate with the lock phase.

Drive Drive Upshift

In the drive drive upshift situation, the output torque is positive before and after the shift. To ensure a good shift with no output torque loss, the following strategy may be used:

1. Drop off-going clutch pressure but hold it in stick and fill the on-coming clutch.
2. Perform the overlap (torque) phase, the on-coming clutch takes over torque from the off-going clutch. The off-going clutch is still in stick at the beginning and it could start to slip during the overlap phase. At the end of the overlap phase, the off-going typically does not transfer any torque anymore and the pressure is equal to or lower than the kiss pressure.
3. Reduce the last part of pressure in off-going to zero and synchronize the on-coming clutch.

Drive Drive Downshift

A drive/drive downshift is a downshift where the output torque stays positive. This situation is needed when more traction torque is needed.

The challenge with this shift type is that the torque directions are not equal. The direction of the TC is positive, which is usually desired. However the torque direction of the on-coming clutch (lower gear) is negative at the start of the shift. Some effort must be taken to make the torque direction of the on-coming clutch positive.

This shift may include one or more of the following steps:

1. Drop pressure in the off-going clutch but hold it in stick and already fill the on-coming clutch.
2. Reduce pressure in the off-going clutch and bring the off-going clutch into slip. Hold the on-coming clutch at kiss pressure. Control the slip of the on-coming clutch with off-going pressure changing the torque direction.
3. Overlap, take over torque from off-going clutch to on-coming clutch.

4. Synchronization
5. Drop pressure in the off-going clutch but hold it in stick and already fill the on-coming clutch.
6. Reduce pressure in the off-going clutch and bring the off-going clutch into slip. Hold the on-coming clutch at kiss pressure. Control the slipe of the on-coming clutch by controlling the pressure of the off-going clutch to change the torque direction.
7. Overlap, take over torque from the off-going clutch to the on-coming clutch. But here the on-coming clutch usually already synchronizes during the overlap
8. Lock the on-coming clutch and reduce the pressure in the off-going clutch to hand over torque to the closed clutch Brake Brake Upshift/Downshift The brake brake upshift may include the same strategy as the drive drive downshift (see above). The brake brake downshift may include the same strategy as the drive drive upshift (see above).

Brake Drive Upshift/Downshift

In the brake drive upshift situation, the output torque is negative at the beginning of the shift and changes sign at some point during the process. This may correspond to driving downhill using the engine brake and upshifting to start accelerating the vehicle again. The shift process starts as for a brake brake upshift (see above) the difference being that during one of the four steps, the TC torque direction reverses.

If the reversal happens during step 1, the shift may proceed exactly as a drive drive upshift.
If the reversal happens during step 2, then releasing pressure in the off-going clutch may not reverse the slip speed sign. This will typically be detected by the controller because the pressure in the off-going clutch may reach the kiss pressure level (or lower). It may then immediately skip to the synchronization phase (step 4) since the off-going clutch is not transferring any torque any more.
If the reversal happens during step 3, the fact that the slip speed is controlled to a low level after step 2 may help to automatically reverse the torque direction of the on-coming clutch. Usually, this has no negative effect on the output torque since at the moment it changes sign, it is also necessarily at a very low level. Depending on the torque level after the reversal, either the on-coming clutch torque direction will match very quickly the TC torque direction, or the on-coming clutch will be automatically synchronized, helping step 4.
If the reversal happens during step 4, it will only make it faster.

Typically, the brake drive downshift is unlikely occur. It starts as a brake brake downshift (see above). Usually, the only way to produce a torque reversal while the off-going clutch sticks (which is wanted until the synchronization) is either to slow down the turbine shaft speed by pushing the brake pedal or to accelerate the engine by pushing the acceleration pedal. If the off-going clutch starts to slip, there are typically two possibilities to reverse the TC torque direction: either the consequent turbine shaft deceleration toggles the torque converter from brake to drive condition. If the reversal happens during the drop phase, the shift may seamlessly proceed as for a drive drive downshift (see above). If the reversal happens during the overlap, this usually has no negative effect on the output torque since at the moment it changes sign, it is also necessarily at a very low level. If the reversal happens during the synchronization, it will usually only make it faster.

Drive Brake Downshift/Upshift

In the drive brake downshift situation, the output torque is positive at the beginning of the shift and changes sign at some point during the process. This may correspond to driving under traction and downshifting to slow down the vehicle using engine brake.

The shift process may start as for a drive drive downshift (see above), the difference being that during one of the four steps, the TC torque direction reverses. This situation is the dual of the brake drive upshift and the same comments apply, with the only difference being that "drive drive upshift" needs to be replaced with "brake brake downshift" if the reversal happens during step 1 (see above).

Usually, the drive brake upshift is unlikely to occur. The shift may start as a drive drive upshift (see above) and there may be two possibilities to trigger this shift. First, the off-going clutch starts to slip before the synchronization phase (which is unwanted in this case) and the turbine shaft acceleration toggles the torque converter condition from drive to brake. Second, the torque direction of the torque converter is reversed due to the falling engine speed. This usually means that the driver suddenly completely releases the acceleration pedal in the middle of the shift (the off-going clutch does not need to slip, though). In any case, if the reversal happens during the drop phase, the shift may seamlessly proceed as for a brake brake upshift (see above). If the reversal happens during the overlap, it typically has no negative effect on the output torque since at the moment it changes sign, it usually is at a very low level. If the reversal happens during the synchronization, it will typically only make it faster.

The invention claimed is:

1. A method of shifting a vehicle transmission, comprising:
providing a vehicle transmission including a first clutching device and a second clutching device, wherein at least a portion of the first clutching device is coupled with at least a portion of the second clutching device;
engaging the second clutching device, wherein engaging the second clutching device includes controlling a state of the second clutching device by changing a state of the first clutching device;
increasing an engagement pressure of the second clutching device by executing a feedforward control procedure using a feedforward engagement pressure profile for the second clutching device; and
reducing the feedforward engagement pressure profile for the second clutching device by a mean dynamic pressure accounting for a dynamic pressure building up in the second clutching device due to a rotation of a clutch shaft of the second clutching device, and the mean dynamic pressure building up in the second clutching device based on at least one of:
an angular speed of the clutch shaft,
a local radius of a clutch piston of the second clutching device,
an inner radius of the clutch piston,
an outer radius of the clutch piston,
a radius of a pipe in fluid communication with the clutch piston, and
a density of a lubricant inside a clutch chamber of the second clutching device.

2. The method of claim 1, wherein an input of the first clutching device is coupled with an input of the second clutching device so that rotation of the input of the first clutching device causes rotation of the input of the second clutching device.

3. The method of claim 2, wherein the input of the first clutching device and the input of the second clutching device are coupled or selectively coupled with a power source.

4. The method of claim 1, wherein an output of the first clutching device is coupled with an output of the second clutching device so that rotation of the output of the first clutching device causes rotation of the output of the second clutching device.

5. The method of claim 4, wherein the output of the first clutching device and the output of the second clutching device are coupled or selectively coupled with a vehicle output, the vehicle output including at least one of a drive shaft, a drive axle, a differential, a final drive, and one or more wheels.

6. The method of claim 1, wherein, while the state of the second clutching device is controlled by changing the state of the first clutching device, no torque or no power is transferred through the second clutching device.

7. The method of claim 1, wherein changing the state of the first clutching device includes changing an engagement pressure of the first clutching device.

8. The method of claim 7, wherein changing the engagement pressure of the first clutching device includes lowering the engagement pressure of the first clutching device.

9. The method of claim 1, wherein controlling the state of the second clutching device by changing the state of the first clutching device includes executing a feedback control procedure, the feedback control procedure comprising at least one of:
- using an engagement pressure of the first clutching device as a first control variable, and
- using a slip speed of the second clutching device as a first process variable.

10. The method of claim 1, wherein the feedforward engagement pressure profile for the second clutching device is determined based on a current input torque of the second clutching device.

11. The method according claim 1, further including the step of decreasing an engagement pressure of the first clutching device by executing at least one of:
- a feedback control procedure using a slip speed of the first clutching device as a process variable and using the engagement pressure of the first clutching device as a control variable, and
- a feedforward control procedure using a feedforward engagement pressure profile for the first clutching device.

12. A method of shifting a vehicle transmission, comprising:
- engaging a second clutching device of the vehicle transmission and controlling a state of the second clutching device by changing a state of a first clutching device of the vehicle transmission, wherein at least a portion of the first clutching device is coupled with at least a portion of the second clutching device;
- determining a first torque transmission direction between a power source coupled to the transmission and the transmission, wherein the first torque transmission direction is one of (i) torque transmission towards the power source and (ii) torque transmission towards a vehicle output;
- determining a second torque transmission direction between an input and an output of the second clutching device based on a current state of the second clutching device, wherein the input of the second clutching device is coupled or selectively coupled with the power source and wherein the output of the second clutching device is drivingly engaged with or selectively drivingly engaged with the vehicle output, wherein the second torque transmission direction is one of (i) torque transmission towards the power source and (ii) torque transmission towards the vehicle output;
- comparing the first torque transmission direction and the second torque transmission direction; and
- controlling the state of the second clutching device based on the outcome of the comparison.

13. The method of claim 12, wherein determining the first torque transmission direction includes at least one of:
- determining a speed ratio between a turbine portion and an impeller portion of a torque converter coupling or selectively coupling the power source with the transmission,
- determining a magnitude of a torsional deflection of a shaft coupling the power source with the transmission, and
- determining a direction of the torsional deflection of a shaft coupling the power source with the transmission.

14. The method of claim 12, wherein determining the second torque transmission direction includes at least one of:
- determining a current speed or a current rotational direction of the input of the second clutching device, and
- determining a current speed or a current rotational direction of the output of the second clutching device.

15. The method of claim 12, wherein, if the outcome of the comparison is that the first torque transmission direction and the second torque transmission direction oppose one another, the step of controlling the state of the second clutching device by changing a state of the first clutching device includes reversing the second torque transmission direction by reversing a sign of a slip speed of the second clutching device.

16. The method of claim 12, further including the step of decreasing an engagement pressure of the first clutching device if or once the first torque transmission direction equals the second torque transmission direction.

17. The method of claim 12, further including the step of increasing an engagement pressure of the second clutching device if or once the first torque transmission direction equals the second torque transmission direction.

18. A method of shifting a vehicle transmission, comprising:
- engaging a second clutching device of the vehicle transmission and controlling a state of the second clutching device by changing a state of a first clutching device of the vehicle transmission, wherein at least a portion of the first clutching device is coupled with at least a portion of the second clutching device;
- decreasing an engagement pressure of the first clutching device by executing at least one of:
  - a feedback control procedure using a slip speed of the first clutching device as a process variable and using the engagement pressure of the first clutching device as a control variable, and
  - a feedforward control procedure using a feedforward engagement pressure profile for the first clutching device; and
- reducing the feedforward engagement pressure profile for the first clutching device by a mean dynamic pressure accounting for a dynamic pressure building up in the first clutching device due to a rotation of a clutch shaft of the first clutching device, wherein the mean dynamic pressure building up in the first clutching device is computed based on at least one of:

an angular speed of the clutch shaft,
a local radius of a clutch piston of the first clutching device,
an inner radius of the clutch piston,
an outer radius of the clutch piston,
a radius of a pipe in fluid communication with the clutch piston, and
a density of a lubricant inside a clutch chamber of the first clutching device.

19. The method of claim 18, wherein, while the state of the second clutching device is controlled by changing the state of the first clutching device, no torque or no power is transferred through the second clutching device.

20. The method of claim 18, wherein changing the state of the first clutching device includes changing an engagement pressure of the first clutching device.

\* \* \* \* \*